Patented Feb. 17, 1953

2,628,952

UNITED STATES PATENT OFFICE 2,628,952

BUTADIENE HYDROCARBON ELASTOMERS HAVING IMPROVED LIGHT STABILITY

Paul A. Sanders, Wilmington, and John R. Vincent, Newport, Del., assignors to E. I. du Pont de Nemours & Company, Wilmington, Del., a corporation of Delaware No Drawing. Application July 27, 1948, Serial No. 40,998

4 Claims. (Cl. 260—45.75)

This invention relates to the preparation of butadiene hydrocarbon elastomers having improved resistance to the deteriorating effects of light.

It is recognized that many polymers, and particularly elastomers including both natural and synthetic rubbers, often change with regard to their physical characteristics upon prolonged exposure to light, and in many instances this deterioration may be of such a degree as to render the articles made therefrom useless for the purpose for which they were designed. The deterioration caused by exposure to light is usually characterized by changes in color and the development of surface cracks, particularly when the elastomer is under tension, and, in extreme cases, the deterioration may be characterized by loss in tensile strength, flexibility, etc. This instability to the deteriorating effects of light materially limits the practical application of rubber and various synthetic rubbers.

While the incorporation of certain waxes into the elastomers has been found to prevent sun checking or other deteriorating effects of light under static exposure conditions, it has been found that, when rubber so treated is exposed to light while being flexed, the degree of effectiveness of such material is greatly reduced and efforts have been made to modify the characteristics of butadiene hydrocarbon elastomers so as to reduce the deteriorating effects of light, particularly under conditions where the elastomer is subjected to flexing or other stresses.

It is therefore an object of the present invention to produce butadiene hydrocarbon elastomers which have improved resistance to the deteriorating effect of light, particularly when such elastomers are subjected to flexing.

We have found that, where small amounts of a nickel salt of a dialkyldithiocarbamic acid are incorporated into a butadiene hydrocarbon elastomer, the vulcanizates resulting therefrom exhibit materially improved stability when subjected to light, both under static and under working or flexing conditions. The butadiene hydrocarbon elastomers with which the present invention is particularly concerned are the 1,3-butadiene polymers, and the interpolymers of 1,3-butadiene with vinyl compounds such as styrene and acrylonitrile, which interpolymers contain 50% or more of the butadiene hydrocarbon.

The nickel dialkyldithiocarbamates employed in the present invention are those in which each alkyl group contains not more than 8 carbon atoms. The alkyl groups which range from methyl to octyl may be the normal or branched chain alkyl groups, that is, primary, secondary or tertiary, and, as illustrated in the following examples, they may be mixed alkyls, that is, those which carry two different alkyl groups.

The nickel dialkyldithiocarbamates are effective when employed in the elastomer in as little as from 0.05%, based on the weight of the elastomer, up to such concentrations as exceed the limits of solubility of such salts in the elastomer, in which latter case the excess salt blooms to the surface and does not contribute further to the stability of the elastomer. The solubility limit may be as high as from 5 to 10 parts per 100 parts of elastomer. When sun cracking is the chief effect to be avoided, it has been found that 0.1 to 2 parts of the nickel dialkyldithiocarbamate will give materially improved results, while from 0.05 to 0.5 part have been found to be effective in counteracting discoloration of these elastomers.

The following examples are given to illustrate the use of the nickel salts of the dialkyldithiocarbamic acids on the sun cracking and discoloration of the 1,3-butadiene elastomers. In the following examples the nickel salts were incorporated into the elastomer by milling in the usual manner. The stocks were then vulcanized and exposed to sunlight or to an artificial light source particularly designed to produce the effect of sunlight at an accelerated rate.

In these examples, after the stocks were compounded according to the formula given in each example, the elastomer was vulcanized (cured) for 45 minutes at 287° F., and similar samples of the resulting elastomers were exposed to direct sunlight with each sample elongated 15% at the start of the test.

In the examples the parts used are by weight.

Example 1

| | |
|---|---|
| GR–S (76.5% butadiene—23.5% styrene) | 100.0 |
| Medium process channel black | 50.0 |
| Zinc oxide | 5.0 |
| Sulfur | 2.0 |
| N-phenyl-alpha-naphthylamine | 1.0 |
| Stearic acid | 0.5 |
| Zinc salt of 2-mercaptobenzothiazole | 1.0 |
| Tetramethyl thiuram monosulfide | 0.25 |

Nickel dibutyldithiocarbamate as indicated below.

| Nickel Dibutyl-dithiocarbamate | Degree of Surface Cracking | |
|---|---|---|
| | 1 week | 1 month |
| None | Badly cracked | Very badly cracked. |
| 0.5 part | No cracks | Badly cracked. |
| 1.0 | do | Do. |
| 1.5 part | do | Slightly cracked. |
| 2.0 part | do | No cracks. |

Example 2

| | |
|---|---|
| GR–S (as in Example 1) | 100.0 |
| Easy processing channel black | 47.0 |
| Zinc oxide | 5.0 |
| A mixture of N-phenyl-beta-naphthylamine, N, N'-diphenyl-p-phenylene diamine and p,p'-dimethoxy diphenylamine | 1.0 |
| "Bardol" (purified coal tar) | 6.0 |
| Pine tar | 4.0 |
| Stearic acid | 1.0 |
| Zinc salt or 2-mercaptobenzothiazole | 1.7 |
| Sulfur | 2.0 |
| Dithiocarbamate of kind and in amount indicated below. | |

| Dithiocarbamate | Parts | Degree of surface cracking, 2 weeks |
|---|---|---|
| None | | Badly cracked. |
| Nickel dibutyldithiocarbamate | 2.0 | No cracks. |
| Nickel diethyldithiocarbamate | 1.4 | Do. |

Example 3

| | |
|---|---|
| Hycar OR-25 (a butadiene-acrylonitrile polymer) | 100.0 |
| High modulus furnace black | 35.0 |
| N-phenyl-alpha-napthylamine | 1.0 |
| Stearic acid | 1.5 |
| Zinc oxide | 5.0 |
| #10 dispersing oil (purified coal tar) | 10.0 |
| Zinc salt of 2-mercapto benzothiazole | 1.5 |
| Sulfur | 1.5 |

Nickel dibutyldithiocarbamate as indicated below.

| Nickel dibutyl-dithiocarbamate | Degree of surface cracking | |
|---|---|---|
| | 1 month | 2 months |
| None | Cracked | Badly cracked. |
| 0.5 part | No cracks | Slightly cracked. |
| 1.0 part | do | Do. |
| 1.5 part | do | Very slightly cracked. |
| 2.0 part | do | Do. |

In the above examples the comparative tests were made by direct exposure to sunlight in Florida for the particular times specified in the examples. The exposure was for a continuous time during the periods stated.

In the following examples the effect of the nickel dialkyldithiocarbamates on light discoloration of white elastomer vulcanizates is given. The tests were made using a "sunshine" carbon arc lamp, as described by Morris, Hollister, Barret and Werkenthen in Rubber Age 55, pages 45–52 (1944).

Example 4

When test pieces of the butadiene-styrene elastomer, compounded as follows and containing the nickel dialkyldithiocarbamate in the amount specified in the following table and vulcanized for 45 minutes at 287° F., were subjected to the "sunshine" carbon arc lamp, the comparative results as tabulated below were obtained:

| | |
|---|---|
| GR–S (non-staining) | 100.0 |
| Zinc oxide | 70.0 |
| Titanium oxide | 20.0 |
| Stearic acid | 0.5 |
| Copper phthalocyanine dispersed in rubber | 0.02 |
| Dibutyl ammonium oleate | 0.6 |
| 2-mercapto benzothiazole disulfide | 0.6 |
| Sulfur | 2.5 |

Dithiocarbamate, as designated below

| Dithiocarbamate Employed | Parts | Discoloration | | |
|---|---|---|---|---|
| | | 8 hours | 24 hours | 48 hours |
| None | | Yellow-brown | Brown | Brown. |
| Nickel dibutyl | 0.25 | Light Yellow | Yellow | Yellow. |
| Nickel dimethyl | 0.25 | do | | |
| Nickel diethyl | 0.25 | | Yellow | Yellow. |
| Nickel di-isopropyl | 0.25 | | do | do. |
| Nickel diallyl | 0.25 | Light Yellow | do | do. |
| Nickel di-2-ethyl-hexyl | 0.25 | do | do | do. |
| Nickel di-beta hydroxy ethyl | 0.25 | do | do | do. |

The following tests were made to compare the effectiveness of nickel dibutyldithiocarbamate with a sun checking resistor of the mixed wax type of U. S. Patent 1,832,964 on a GR–S (butadiene-styrene) tire side wall stock compounded as described below and vulcanized for 90 minutes at 281° F.

| Tire Side Wall Stock | Ex. 5 | Ex. 6 | Ex. 7 | Ex. 8 | Ex. 9 | Ex. 10 |
|---|---|---|---|---|---|---|
| GR–S | 100 | 100 | 100 | 100 | 100 | 102 |
| Mercaptothioazoline | 1 | 1 | 1 | 1 | 1 | 0 |
| Salicylic Acid | 0.5 | 0.5 | 0.5 | 0.5 | 0.5 | 0.1 |
| Sulfur | 2 | 2 | 2 | 2 | 2 | 5 |
| Processing Carbon Black | 25 | 25 | 25 | 25 | 25 | 25 |
| High Modulus Carbon Black | 25 | 25 | 25 | 25 | 25 | 25 |
| Stearic Acid | 2.5 | 2.5 | 2.5 | 2.5 | 2.5 | 2.5 |
| Pine Tar | 4 | 4 | 4 | 4 | 4 | 4 |
| "Bardol" (purified coal tar) | 6 | 6 | 6 | 6 | 6 | 6 |
| "Thermoflex" [1] | 1 | 1 | 1 | 1 | 1 | 1 |
| Nickel Dibutyldithiocarbamate | | 0.5 | 1 | 2 | 1 | |
| "Heliozone" [2] | | | | | 1 | |
| Zinc Oxide | 5 | 5 | 5 | 5 | 5 | 5 |
| Modulus at 300% Elongation | 1,425 | 1,450 | 1,380 | 1,380 | 1,380 | 1,390 |
| Tensile Strength | 1,475 | 1,450 | 1,380 | 1,380 | 1,260 | 1,575 |
| Elongation | 320 | 300 | 300 | 300 | 290 | 340 |
| Hardness | 64 | 64 | 66 | 66 | 64 | 64 |
| One Month's Static Exposure—15% Elongation | ([3]) | ([3]) | ([4]) | O. K. | O. K. | O. K. |

[1] A mixture of N-phenyl-beta-naphthylamine, N,N'-diphenyl-p-phenylenediamine and p,p'-dimethoxy diphenylamine.
[2] A mixture of waxes—see U. S. P. 1,832,964.
[3] Badly checked.
[4] Checked.

| No. of Days Flexed | Extent of Surface Cracking | | | | | |
| --- | --- | --- | --- | --- | --- | --- |
| | Ex. 5 | Ex. 6 | Ex. 7 | Ex. 8 | Ex. 9 | Ex. 10 |
| 1 to 3 | O. K. | O. K. | O. K. | O. K. | O. K. | O. K. |
| 4 | S | S | O. K. | O. K. | O. K. | O. K. |
| 7 | C | S | S | O. K. | S | C |
| 8 | C | S | S | S | S | C |
| 9 | B | C | S | S | C | B |
| 10 | B | C | S | S | C | B |
| 11 | B | C | S | S | C | B |
| 14 | B | B | C | C | B | B |
| 15 | B | B | B | C | C | B |
| 16 | B | B | B | C | C | B |

S=slight.
C=considerable.
B=bad.

In the above examples the flexing tests were carried out on an outdoor flexing machine (dynamic exposure test) in the following manner:

The stock to be tested (in the form of a strip 1 inch x 6 inches x 0.075 inch) was vulcanized on a canvas backing. This strip was then pulled back and forth (about one cycle per minute) over a cylinder ¾ inch in diameter with the stock on the outside. The test piece was thus alternately flexed and relaxed as it passed back and forth over the cylinder. The cylinder, which bore a number of samples under simultaneous test, was placed in full sun with its axis running east and west. The flexing was carried on continuously even when there was no sun. The samples were examined for cracking after the first two, four and six hours' exposure, then daily.

As indicated in the above examples, 0.5 part of nickel dibutyldithiocarbamate was sufficient to prevent more than slight checking after eight days' exposure in the flexing test. In similar tests the same stock, containing one part of the currently used sun checking inhibitor alone, showed considerable checking after four days, whereas under static exposure conditions the currently used sun checking inhibitor was effective. When one part of the nickel dibutyldithiocarbamate was employed in the same formula, only slight checking was experienced after eleven days' exposure during flexing.

Dibutyldithiocarbamates of vanadium, chromium, manganese, potassium, zinc, copper, lithium, cadmium, tin, silver, thallium, mercury, uranium, calcium, cerium, molybdenum, lead, antimony, aluminum, barium, bismuth, zirconium and the diamyl dithiocarbamate of iron were tested in the same manner, using 2.0 parts of the dithiocarbamate and exposing the test pieces under static conditions (15% elongated) for two weeks in Florida. None of these salts produced a vulcanizate cracking less rapidly than the control.

The nickel dithiocarbamates therefore appear to be unique among the metal dithiocarbamates in their stabilizing action on elastomer vulcanizates. None of the other metals showed any indication of acting in a manner similar to the nickel, in retarding sun cracking.

The nickel dialkyldithiocarbamates of the present invention may be applied to stocks containing any of the fillers, pigments, reenforcing agents, plasticizers, vulcanizing agents, antioxidants and accelerators useful in butadiene hydrocarbon elastomers. Those specifically mentioned in the examples are given merely to illustrate the invention on typical types of compounded elastomers currently used in the manufacture of synthetic rubber articles.

This invention provides a means of increasing the useful life of white and light colored elastomer articles and of increasing the useful life of light or dark elastomer articles which are exposed to light during use.

We claim:

1. A butadiene hydrocarbon elastomer of the class consisting of homopolymers of 1,3-butadiene and interpolymers of 1,3-butadiene with vinyl compounds, which interpolymers contain at least 50% of the butadiene hydrocarbon, which elastomer has intimately incorporated therein from 0.05 to 10%, based on the weight of the elastomer, of a nickel salt of a dialkyldithiocarbamic acid in which each of the alkyl groups contains not more than 8 carbon atoms.

2. A butadiene hydrocarbon elastomer of the class consisting of homopolymers of 1,3-butadiene and interpolymers of 1,3-butadiene with vinyl compounds, which interpolymers contain at least 50% of the butadiene hydrocarbon, which elastomer has intimately incorporated therein from 0.05 to 10%, based on the weight of the elastomer, of nickel dibutyldithiocarbamate.

3. A 1,3-butadiene hydrocarbon homopolymer having improved resistance to the deteriorating effects of light which has intimately incorporated therein from 0.05 to 10%, based on the weight of the elastomer, of a nickel salt of a dialkyldithiocarbamic acid in which each of the alkyl groups contains not more than 8 carbon atoms.

4. An interpolymer of 1,3-butadiene and styrene containing at least 50% of the butadiene hydrocarbon, which interpolymer has intimately incorporated therein from 0.05 to 10%, based on the weight of the interpolymer, of a nickel salt of a dialkyldithiocarbamic acid in which each of the alkyl groups contains not more than 8 carbon atoms.

PAUL A. SANDERS.
JOHN R. VINCENT.

REFERENCES CITED

The following references are of record in the file of this patent:

UNITED STATES PATENTS

| Number | Name | Date |
| --- | --- | --- |
| 2,286,738 | Hill | June 16, 1942 |
| 2,376,339 | Browning, Jr., et al. | May 22, 1945 |
| 2,391,742 | Roberts | Dec. 25, 1945 |
| 2,538,047 | Sanders et al. | Jan. 16, 1951 |